United States Patent

Tielemans et al.

Patent Number: 6,046,881
Date of Patent: Apr. 4, 2000

[54] COMPACT DATA STORAGE UNIT HAVING SPIRAL GROOVE BEARINGS

[75] Inventors: Leonardus P. M. Tielemans; Evert M. H. Kamerbeek, both of Eindhoven, Netherlands

[73] Assignee: U.S. Philips Corporation, New York, N.Y.

[21] Appl. No.: 08/919,935

[22] Filed: Aug. 28, 1997

Related U.S. Application Data

[63] Continuation of application No. 08/591,774, Jan. 18, 1995, abandoned, which is a continuation of application No. 08/071,910, Jun. 3, 1993, abandoned.

[30] Foreign Application Priority Data

Jun. 9, 1992 [EP] European Pat. Off. .............. 92201654

[51] Int. Cl.[7] .................................................. G11B 17/02
[52] U.S. Cl. ........................................................ 360/99.08
[58] Field of Search ............................. 360/99.08, 99.04, 360/99.01, 98.07, 98.01, 97.01, 99.12; 310/67 R

[56] References Cited

U.S. PATENT DOCUMENTS

| | | |
|---|---|---|
| 4,633,149 | 12/1986 | Welterlin .................................. 318/254 |
| 4,717,977 | 1/1988 | Brown ........................................ 360/98 |
| 5,001,581 | 3/1991 | Elsasser et al. ....................... 360/97.02 |
| 5,195,002 | 3/1993 | Sakurai ................................. 360/99.08 |
| 5,251,082 | 10/1993 | Elliott et al. ..................... 360/97.02 X |
| 5,284,391 | 2/1994 | Diel et al. ......................... 360/99.12 X |
| 5,328,271 | 7/1994 | Titcomb ............................... 360/99.12 |
| 5,488,523 | 1/1996 | Seaver et al. ....................... 360/99.12 |

FOREIGN PATENT DOCUMENTS

| 55-052556 | 4/1980 | Japan . |
|---|---|---|
| 5552556 | 4/1980 | Japan . |

*Primary Examiner*—William R. Korzuch
*Attorney, Agent, or Firm*—Robert J. Kraus

[57] ABSTRACT

A data storage unit comprises a housing, an information disc which is centrically rotatable about an axis of rotation, and an electrical drive unit for driving the information disc. A bearing supports the information disc and the rotor relative to the housing and a scanning unit is provided for cooperation with the information disc. The housing includes two plane-parallel main walls which are oriented transversely of the axis of rotation, which each have a contour at least substantially similar to that of the information disc, and which are interconnected by smaller side walls. The housing forms a cartridge accommodating the information disc, the electrical drive unit and the scanning unit. The information disc is disposed in a plane intersecting the electrical drive unit and the scanning unit is situated between the information disc and one of the main walls.

22 Claims, 4 Drawing Sheets

COMPACT DATA STORAGE UNIT HAVING SPIRAL GROOVE BEARINGS

This is a continuation of application Ser. No. 08/591,774, filed Jan. 18, 1995, now abandoned, which is a continuation of application Ser. No. 08/071,910, filed Jun. 3, 1993, now abandoned.

BACKGROUND OF THE INVENTION

The invention relates to a data storage unit comprising a housing, an information disc which is centrically rotatable about an axis of rotation, an electrical drive unit for driving the information disc, which drive unit comprises a stator and a rotor which is rotatable about a rotor axis. The rotor axis being oriented in the same direction as the axis of rotation. The data storage unit further including a bearing for supporting the information disc and the rotor relative to the housing, and a scanning unit for cooperation with the information disc.

Such a unit is known as a magnetic recording apparatus from JP-A 55-52556 (herewith incorporated by reference). The known apparatus has a bulky housing made up of a large number of parts, whose width increases in steps viewed from the top to the bottom. The housing accommodates an electric motor having an outgoing motor shaft carrying a magnetic recording disc extending underneath the motor. The long motor shaft has two ends supported in spherical bearings. A drawback of the known apparatus is its bulkiness, which is dictated mainly by the large axial dimension of the housing, as a result of which the apparatus is not suitable for use in many modern storage systems. Moreover, the known apparatus is difficult to miniaturize.

SUMMARY OF THE INVENTION

It is an object of the invention to provide a data storage unit of the type defined in the opening paragraph but having minimal dimensions.

The data storage unit in accordance with the invention is characterized in that the housing comprises two plane-parallel main walls which are oriented transversely to the axis of rotation, which each have a contour at least substantially similar to that of the information disc, and which are interconnected by smaller side walls. The housing constitutes a cartridge for accommodating the information disc, the electrical drive unit and the scanning unit, the information disc being disposed in a plane intersecting the electrical drive unit, and the scanning unit being situated between the information disc and one of the main walls.

The data storage unit in accordance with the invention is a compact easy-to-handle cartridge. The limited space available in the housing being utilized to an optimum extent in a surprising manner. Preferably, the information disc extends in a plane intersecting the rotor of the drive unit. If the rotor axis coincides with the axis of rotation the information disc is preferably formed with a central opening through which the rotor of the drive unit extends, and the information disc is preferably secured to the rotor.

The size of the data storage unit in accordance with the invention is largely dictated by the diameter of the information disc accommodated in the housing. Particularly when a small information disc, for example of 1.3 inch diameter, is used the unit in the form of a cartridge can easily be secured to or in a data storage system, is easy to take along, and is easy to store.

The data storage unit in accordance with the invention is very suitable for recording data on the information disc with a high information density. Preferably, the information disc is constructed as a hard-magnetic disc on which information can be stored by use of the scanning unit, which comprises at least one magnetic head.

The data storage unit should comply with stringent requirements of mechanical accuracy such as the manner in which the information-disc is supported. In order to enable information with an intertrack spacing of only a few micrometers to be written and/or read a highly accurate rotation of the information disc is required.

Irregular radial excursions (non-repeatable runouts) of the information disc of only a few nanometers and regular radial excursions (repeatable runouts) of the information disc of only a few nanometers are attainable with the embodiment of the unit in accordance with the invention which is characterized in that a dynamic spiral-groove bearing is arranged near each of the main walls, which bearing comprises a bearing member shaped as a segment of sphere and a bearing member shaped as a hollow segment of sphere, one of which bearing members has a groove pattern, one of the bearing members being stationary and being secured to a main wall and the other bearing member being rotatable and being connected to the rotor. In view of the desired bearing stiffness and load-bearing capacity the dynamic spiral-groove bearings are preferably of the hydrodynamic type.

Preferably, the above embodiment is also characterized in that at least one of the main walls has a compliant wall portion positioned around the stationary bearing member, magnetic forces of the drive unit producing an axial preload on the spiral-groove bearing. This embodiment yields a tolerance-insensitive construction by the use of the high specific axial load-bearing capacity of the spherical spiral-groove bearings used in conjunction with the use of a local reduction of the flexural strength of one or both main walls in a direction parallel to the axis of rotation of the information disc. The radial bearing stiffness, which is important for the high accuracy of rotation of the information disc, depends upon the axial preload to a small extent only. A compliant wall portion can be obtained by a suitable choice of the material, for example aluminium, and the wall thickness of the main walls.

Another possibility is to provide radial grooves in a main wall around the stationary bearing section, so that this main wall becomes locally compliant in a direction parallel to the axis of rotation of the information disc, the required stiffness in a direction transverse to the axis of rotation being hardly influenced. A unit in accordance with the invention thus manufactured is characterized in that the electrical drive unit is an axial-field motor, the rotor having an axially magnetized multi-pole rotor magnet and means being provided for shielding the information disc from magnetic stray flux produced by the motor. In a practical embodiment the means comprise an annular soft-magnetic body extending between the rotor magnet and the information disc.

An embodiment of the data storage unit in accordance with the invention is characterized in that the main walls are made of a soft-magnetic material and form part of the stator of the axial-field motor, each of the main walls, at the side facing the rotor, carrying a set of energizing coils for cooperation with the rotor magnet. In this way a very high degree of integration of the drive unit, the bearing and the housing of a soft-magnetic material is achieved, resulting in a light-weight very compact data storage unit comprising a small number of parts. The energizing coils can be manufactured separately and can be secured to the main walls by an adhesive. The coils can also be formed directly on the main walls, for example by lithography techniques. The presence of the radial grooves will mitigate the occurrence of eddy currents in the soft-magnetic material of the main walls.

An embodiment is characterized in that the stationary bearing parts are surrounded by energizing coils.

An embodiment is characterized in that the rotatable bearing parts are secured to the rotor magnet.

BRIEF DESCRIPTION OF THE DRAWINGS

The invention will now be described in more detail, by way of example, with reference to the drawings, in which.

DETAILED DESCRIPTION OF THE PREFERRED EMBODIMENTS

Figure 1:
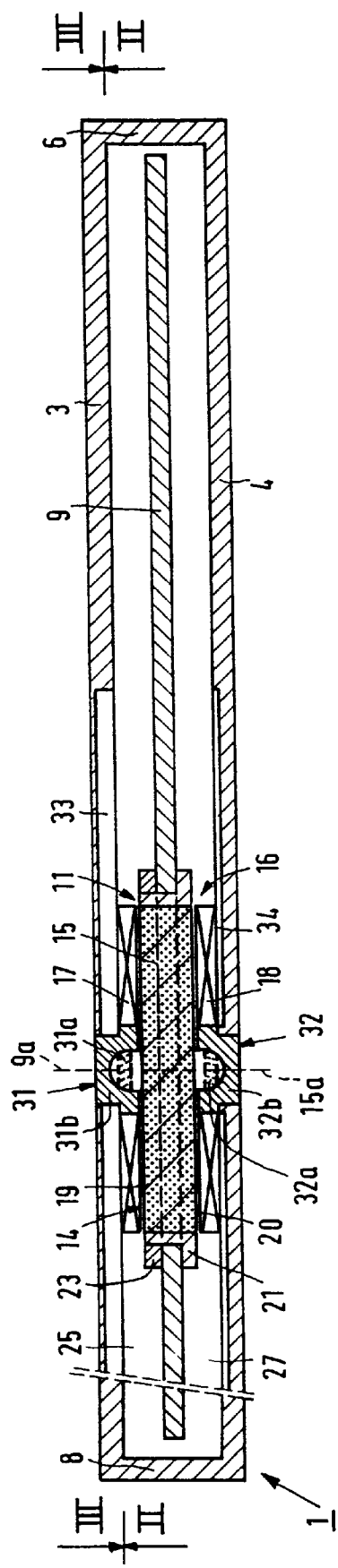
FIG. 1 is a sectional view showing a first embodiment of the data storage unit in accordance with the invention.
Figure 2:
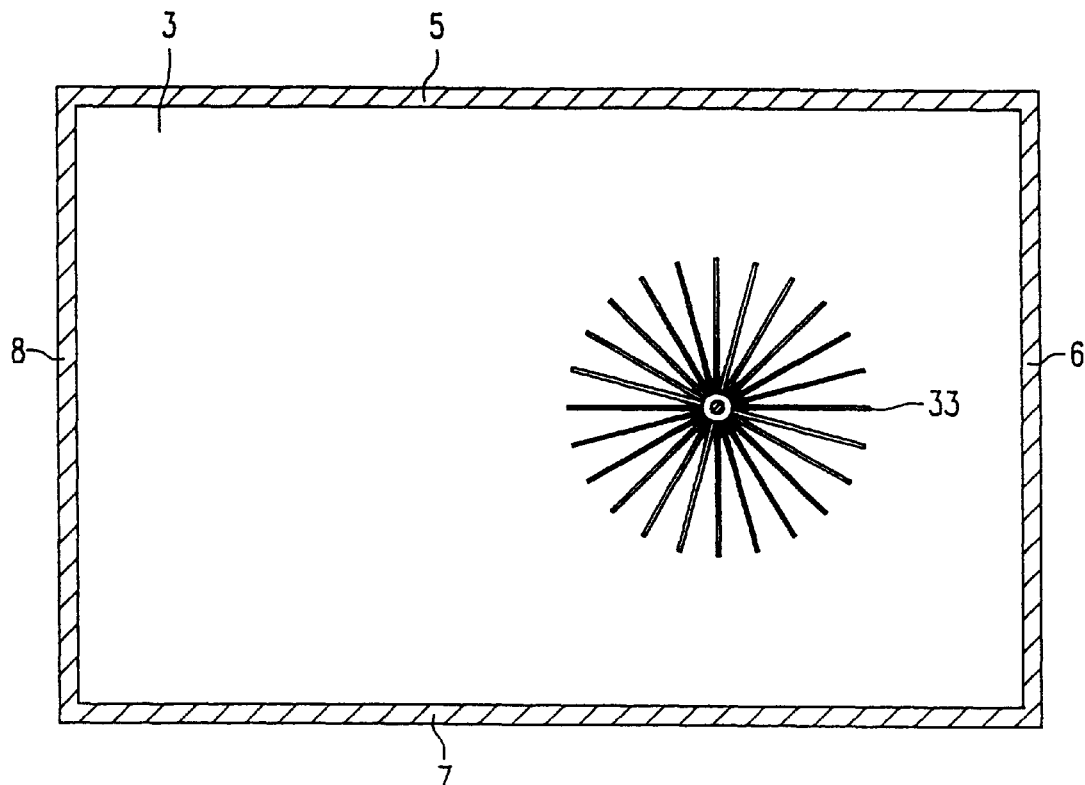
FIG. 2 shows the unit of FIG. 1 in a sectional view taken on the line II—II.
Figure 3:
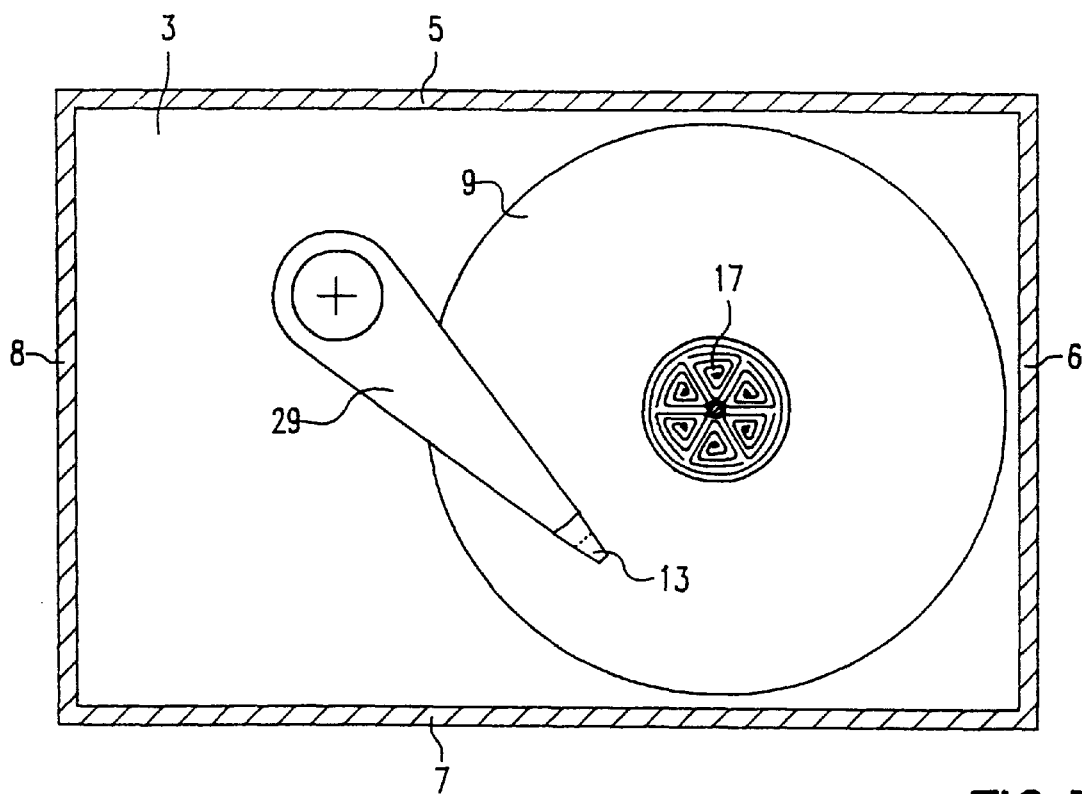
FIG. 3 shows the unit of FIG. 1 in a sectional view taken on the line III—III.

The data storage unit in accordance with the invention shown in FIGS. 1, 2 and 3 comprises a housing 1 having two parallel main walls 3 and 4 and four side walls 5, 6, 7 and 8 interconnecting the main walls. The walls 3 to 8 are made of a soft-magnetic material, for example aluminium or an iron-silicon alloy. The housing 1 forms an at least substantially imperforate cartridge accommodating an information disc 9 which is rotatable about an axis of rotation 9a, an electrical drive unit 11 for rotating the information disc 9, and a scanning device for scanning the information disc 9. In the present example the housing has a length of 49 mm, a width of 34 mm and a height of 3.3 mm.

The drive unit 11 is constructed as an axial-field motor comprising a rotor 14 with a permanently magnetized multipole rotor magnet 15 and a stator 16 with two sets of coils 17 and 18, the rotor magnet preferably being a high-energy magnet, for example of NiFeB. The rotor magnet 15, which is rotatable about a rotor axis 15a which coincides with the axis of rotation 9a, is axially magnetized and opposite each of the coil systems 17 and 18 and has magnetic poles, in the present case eight. The coil systems 17 and 18, which in the present example comprise six coils each, cooperate with the rotor magnet 15 via an air gap 19 or 20 and are arranged on the main walls 3 and 4 respectively.

In the present example the information disc 9 is a so-called magnetic hard disc of 1.3 inches, comprising a base carrying on one side or, as in the present example, on both sides a magnetic layer in which information has been stored or can be stored. The information disc, which has a central opening through which the rotor 14, in particular the rotor magnet 15, extends, is secured to the rotor 14. For this purpose an annular soft-magnetic body 21, for example made of iron, is arranged around the rotor magnet 15. The information disc 9 is centered and is secured on the soft magnetic body 21 by a ring 23. The soft-magnetic body 21 also shields the information disc 9 from stray flux produced by the drive unit 11.

In the present example the scanning device comprises one scanning unit 13 on each side of the information disc 9. Each scanning unit 13 is situated in a space 25 or 27 between the information disc 9 and one of the main walls 3 or 4, and includes a magnetic head, arranged on a pivotal arm 29, for writing and/or reading information.

The data storage unit comprises bearings for supporting the rotor 14 and the information disc 9 secured to this rotor relative to the housing 1. The bearing comprise two hydrodynamic spiral-groove bearings 31 and 32, each comprising a bearing member 31a and 32a respectively shaped as a segment of sphere, and a bearing member 31b and 32b respectively shaped as a hollow segment of sphere. The bearing members 31a and 32a, which each have a smooth bearing surface, are secured to the rotor 14, and the bearing members 31b and 32b, which each have a bearing surface formed with a groove pattern, are secured to the main walls 3 and 4 respectively. During rotation of the rotor 14 the groove patterns give rise to a pressure build-up in a medium, such as grease or oil, present between the bearing surfaces of the respective spiral-groove bearings.

In order to minimize tolerances, the flexural strength of the bearing suspension in both main walls 3 and 4 is locally reduced. This is realized by providing the main walls 3 and 4 with a plurality of grooves 33 and 34, which extend radially from the bearings 31 and 32 respectively. The required axial preload on the bearing is provided by magnetic forces of the drive unit.

Figure 4:
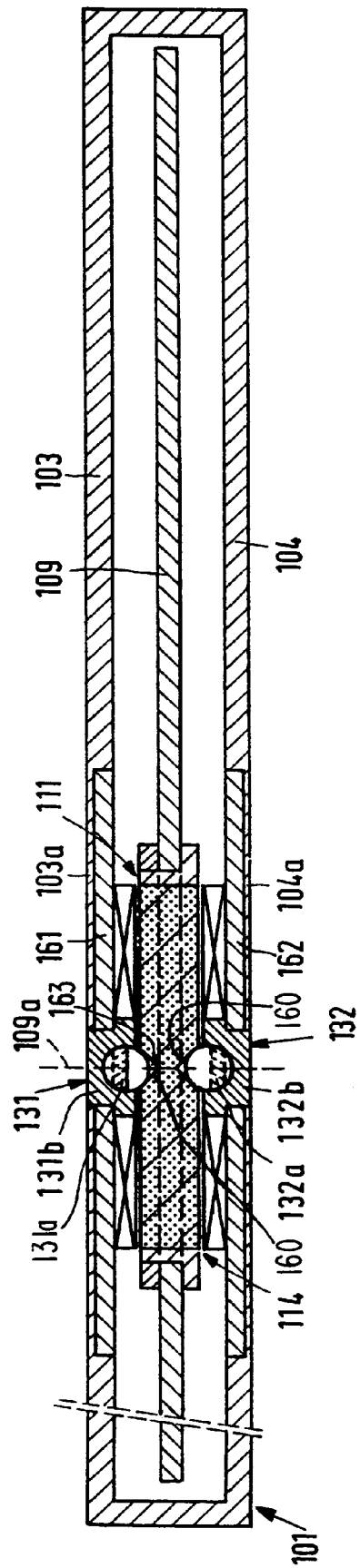
FIG. 4 is a sectional view showing a part of a second embodiment of the data storage unit in accordance with the invention.

The embodiment shown in FIG. 4 bears much resemblance to the data storage unit shown in FIGS. 1, 2 and 3. The unit comprises a magnetically non-conductive housing 101, for example made of aluminium, an information disc 109 which is centrically rotatable about an axis of rotation 109a, an electrical drive unit 111, two dynamic spiral-groove bearings 131 and 132, and a scanning unit, not shown, for cooperation with the information disc. The housing 101 has two plane-parallel main walls 103 and 104 oriented transversely of the axis of rotation 109a, which walls each have a contour at least similar to that of the information disc 109. The housing 101, which takes the form of a cartridge, accommodates the information disc 109, the drive unit 111, and the scanning unit interposed between the information disc and one of the main walls. The cartridge comprises means for mechanically and electrically connecting the cartridge to an external apparatus or system, such as for example a computer system. Around the bearings 131 and 132 the main walls 103 and 104 have thin wall portions 103a and 104a respectively for locally reducing the flexural strength.

In order to form a stator yoke for the drive unit 111 soft-magnetic plates 161 and 162 are provided at the location of the thin magnetically non-conductive wall portions 103a and 104a respectively.

The bearings 131 and 132 each have a bearing member 131a and 132a respectively shaped as a segment of sphere and, cooperating therewith, a bearing member 131b and 132b respectively shaped as a hollow segment of sphere. The bearing members 131b and 132b each have a pattern of grooves. The bearing members 131a and 132a, which each have a smooth bearing surface, form part of spherical bodies mounted in recesses 160 in a rotor 114 of the drive unit 111 and secured to the rotor by an adhesive 163.

Figure 5:
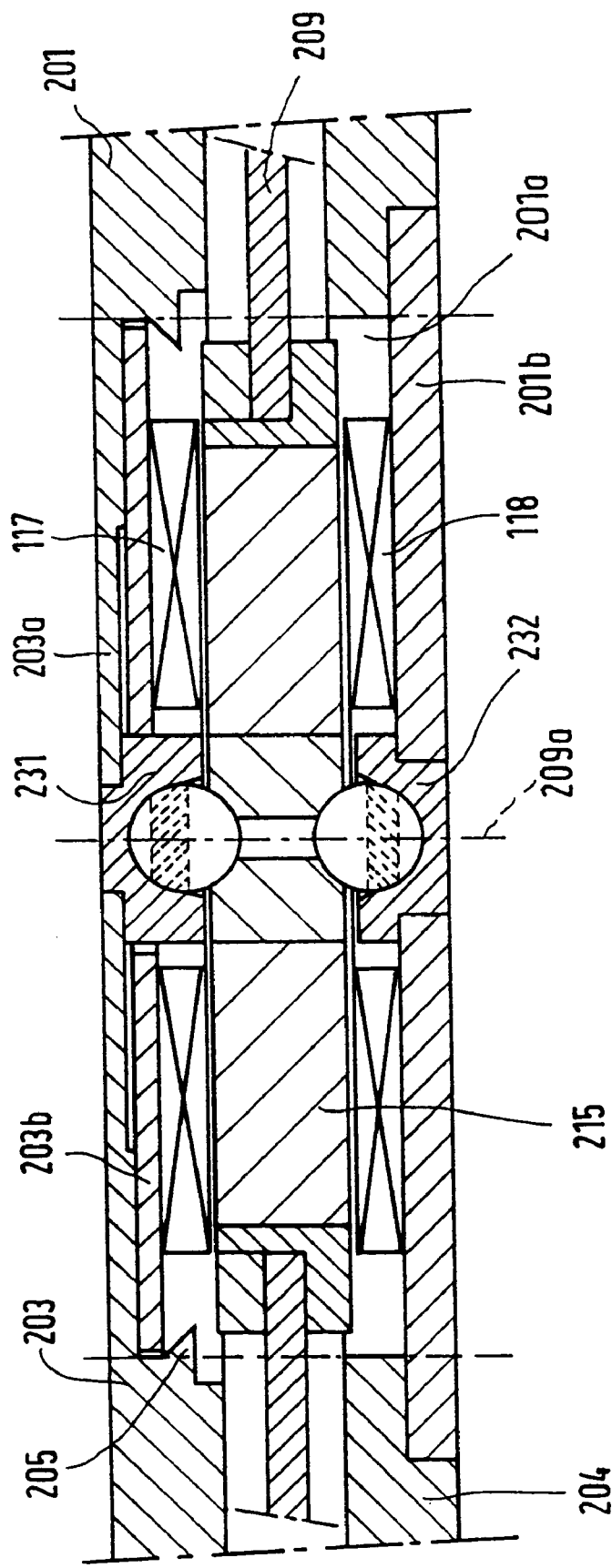
FIG. 5 is a sectional view showing a part of a third embodiment.

The embodiment shown in FIG. 5, which also bears much resemblance to the unit shown in FIGS. 1, 2 and 3, comprises a housing 201 of a non-magnetic material, for example a reinforced plastic, having an opening 201a in which an end plate 201b of a soft-magnetic or ferromagnetic material is mounted. The housing 201 has two parallel main walls 203 and 204 oriented transversely of an axis of rotation 209a and each carrying a respective bearing 231 or 232. The bearing 231 is secured in a thin wall portion 203a of the main wall 203 and the bearing 232 is secured in the end plate 201b mounted in the main wall 204. The housing 201 accommodates an electrical drive unit comprising a rotor with a rotor magnet 215, an information disc 209, and drive coils. The drive coils include a set of coils 118 arranged on the end plate 201b and another set of coils 117 arranged on an end plate 203b mounted against the main wall 203. The end plate 203b can be secured by a folded joint 205. The bearing 232 forms a comparatively stiff assembly with the end plate 201b and the main wall 204. The bearing 231, which is isolated from the end plate 203b, is secured in the housing 201 in a comparatively flexible manner owing to the thin wall portion 203a, which functions as a diaphragm. This construction enables the bearings to be mechanically preloaded in a well-defined manner. Since the end plate 203b forms a comparatively stiff assembly with the main wall 203 the axial magnetic forces on the rotor cancel one another fully or almost fully, thereby ensuring optimum bearing in operation.

It is to be noted that the invention is not limited to the embodiments shown herein. For example, in certain cases only one system of coils may be required. Moreover, several methods of securing the information disc to the rotor of the drive unit are possible.

What is claimed is:

1. A data storage unit, comprising:
   a housing for receiving an information disc centrally rotatable about an axis of rotation, the housing including two plane-parallel main walls oriented transversely to the axis of rotation, and smaller side walls interconnecting said main walls;
   an information disc within said housing parallel to said main walls;
   an electrical axial field motor for driving the information disc, including a stator and a rotor rotatable about a rotor axis, the rotor axis being oriented in the same direction as the axis of rotation, the rotor carrying said information disc;
   a dynamic spiral groove bearing at each main wall for supporting the information disc and the rotor relative to the housing, each bearing including a first spherical member and a second hollow-spherical member, one of the first and second members having a groove pattern, and one of the first and second members being stationary and secured to one of said main walls, the other of the first and second members being rotatable with respect to the stationary member, and the main walls being substantially stiff in directions transverse to the axis of rotation and at least one of said stationary members being secured to an axially-compliant wall portion of one of said main walls for effecting an axial preload relative to the bearings;
   a scanning unit for cooperation with the information disc and positioned between the information disc and one of the main walls;
   said rotor of said motor comprising a disc-shaped axially magnetized multi-pole rotor magnet being positioned substantially midway between the two main walls of the housing, the information disc extending in a plane intersecting the rotor magnet; and
   said stator of said motor comprising at least one set of energizing coils positioned at the side of one of said main walls facing the rotor, the coils being opposite the rotor magnet.

2. A unit as claimed in claim 1, wherein magnetic forces of the axial field motor produce an axial preload on at least one of the spiral-groove bearings.

3. A unit as claimed in claim 2, wherein the axially-compliant wall portion includes radially oriented grooves.

4. A unit as claimed in claim 3, wherein the rotor axis coincides with the axis of rotation, and the information disc is secured to the rotor and formed with a central opening through which the rotor extends.

5. A unit as claimed in claim 1 wherein at least one of the stationary bearing members is surrounded by the at least one set of energizing coils.

6. A unit as claimed in claim 1, wherein the at least one set of energizing coils is secured to one of the main walls by an adhesive.

7. A unit as claimed in claim 1, wherein the at least one set of energizing coils is formed directly on one of the main walls by using lithography.

8. A data storage unit as in claim 1 where
   said stator of said motor comprises a pair of equal sets of energizing coils, each being positioned at the side of a respective one of said main walls which faces the rotor, the rotor magnet extending between the pair of energizing coils such that during operation of said motor said coils provide an equal axial force on each of said dynamic spiral groove bearings.

9. A unit as claimed in claim 8, wherein the rotor axis coincides with the axis of rotation, and the information disc is secured to the rotor and formed with a central opening through which the rotor extends.

10. A unit as claimed in claim 9, wherein the rotor includes means for shielding the information disc from magnetic stray flux produced by the motor.

11. A unit as claimed in claim 10, wherein the means for shielding includes an annular soft-magnetic body extending between the rotor magnet and the information disc.

12. A unit as claimed in claim 11, wherein the main walls comprise a soft-magnetic material and form part of the stator of the axial-field motor.

13. A unit as claimed in claim 10, wherein the main walls comprise a soft-magnetic material and form part of the stator of the axial-field motor.

14. A unit as claimed in claims 8 or 1, wherein the axially-compliant wall portion comprises radial grooves.

15. A unit as claimed in claim 8, wherein the housing is formed of a non-magnetic material and includes end plates mounted in each main wall, said end plates consisting essentially of one of a soft magnetic material and a ferromagnetic material.

16. A data storage unit, comprising:
    a housing for receiving an information disc centrally rotatable about an axis of rotation, the housing including two plane-parallel main walls oriented transversely to the axis of rotation, and smaller side walls interconnecting said main walls;
    an information disc within said housing parallel to said main walls, said disc having a central opening;
    an electrical axial field motor for driving the information disc, including a stator and a rotor rotatable about a rotor axis, said rotor axis coinciding with the axis of rotation, the rotor carrying said information disc;
    a dynamic spiral groove bearing at each main wall for supporting the information disc and the rotor relative to the housing, each bearing including a first spherical member and a second hollow-spherical member, one of the first and second members having a groove pattern, and one of the first and second members being stationary and secured to one of said main walls, the other of the first and second members being rotatable with respect to the stationary member, and the main walls being substantially stiff in directions transverse to the axis of rotation and at least one of said stationary members being secured to an axially-compliant wall portion of one of said main walls for effecting an axial preload relative to the bearings;

a scanning unit for cooperation with the information disc and positioned between the information disc and one of the main walls;

said rotor of said motor comprising a disc-shaped axially magnetized multi-pole rotor magnet being positioned substantially midway between the two main walls of the housing and disposed substantially within the central opening of the information disc, the information disc extending in a plane intersecting the rotor magnet; and said stator of said motor comprising a set of energizing coils positioned at the side of one of said main walls facing the rotor, the coils being opposite the rotor magnet.

17. A unit as claimed in claim 16, wherein magnetic forces of the axial field motor produce an axial preload on at least one of the spiral-groove bearings.

18. A unit as claimed in claim 16, wherein the rotor includes means for shielding the information disc from magnetic stray flux produced by the motor.

19. A unit as claimed in claim 18, wherein the main walls comprise a soft-magnetic material and form part of the stator of the axial-field motor.

20. A unit as claimed in claim 16 wherein one of the stationary bearing members is surrounded by the energizing coils.

21. A unit as in claim 16 wherein said stator further comprises a second set of energizing coils positioned at a side of the other of said main walls.

22. A unit as in claims 8, 1 or 16 where, in operation, the compliant wall portion cooperates with magnetic forces produced by the energizing coils to produce axial preloads on the spiral groove bearings.

* * * * *